Nov. 24, 1953     A. G. HUPP     2,660,271
TRACTOR HITCH

Filed July 29, 1948     2 Sheets-Sheet 1

INVENTOR.
Arleigh G. Hupp
BY
Andrus & Nueler
Attorneys

Patented Nov. 24, 1953

2,660,271

UNITED STATES PATENT OFFICE 2,660,271

TRACTOR HITCH

Arleigh Glynn Hupp, South Milwaukee, Wis., assignor to The Midland Co., South Milwaukee, Wis., a corporation of Wisconsin Application July 29, 1948, Serial No. 41,230

6 Claims. (Cl. 189—36)

This invention relates to a tractor hitch of the type employed with small garden tractors for lawn mowers, garden implements and the like.

This type of hitch generally employs a downwardly facing channel member on the tractor with spaced notches for receiving a pair of horizontally spaced transverse bars on the implement, and a clamp for securing the bars in place when seated in the corresponding notches.

Improvements to this type of hitch require that the bars remain in a standard spacing in order that the hitch will fit the many implements which have been sold.

The present invention involves a very substantial improvement in the channel hitch member carried by the tractor and also in the clamp without altering the position of the bars carried by the implements.

One of the principal objects of the invention is to provide a tractor hitch which will facilitate alignment of the bars with the corresponding notches in entering the same and provide for alignment of the implement with the tractor in all three planes, i. e., vertical transverse, vertical longitudinal and the horizontal plane, during assembly of the hitch.

Another object of the invention is to provide a hitch which is more readily and rapidly assembled and disassembled.

Another object is to provide a hitch which is less apt to become loose so that the implement will not become accidentally released from the tractor during operation.

Another object is to provide a hitch that will remain in interlocked position during clamping.

Another object is to provide a hitch and a clamp therefor which is less costly than previous hitches of the same general type.

Other objects and advantages appear hereinafter.

An embodiment of the invention is illustrated in the accompanying drawings in which.

Figure 1:
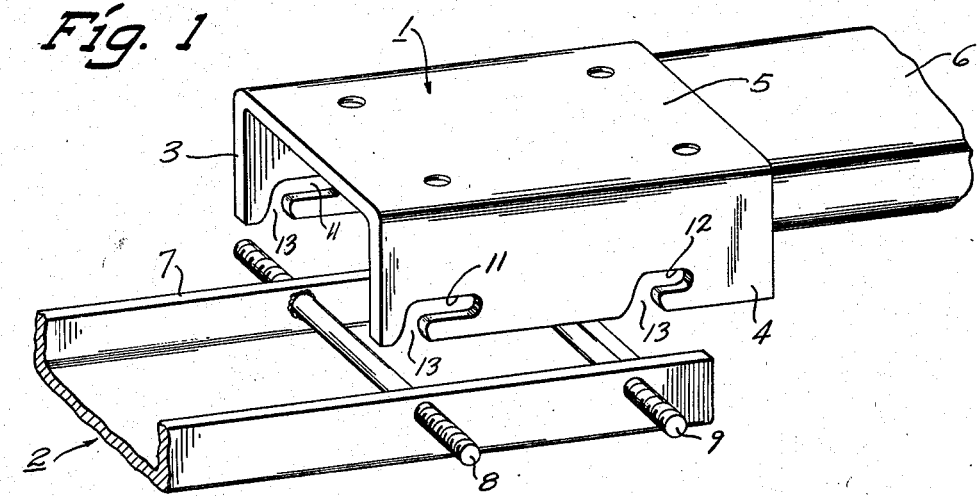
Figure 1 is a perspective view of the two hitch members in position just prior to assembly.
Figure 2:
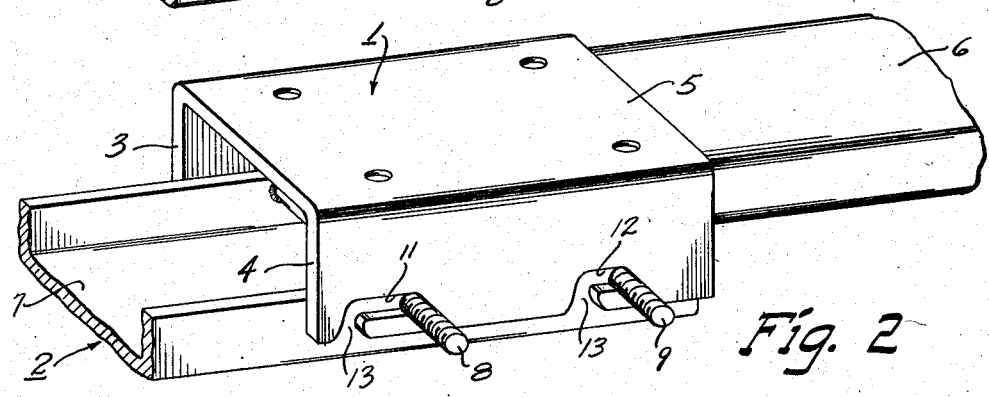
Fig. 2 is a similar view showing the members assembled and secured together.
Figure 3:
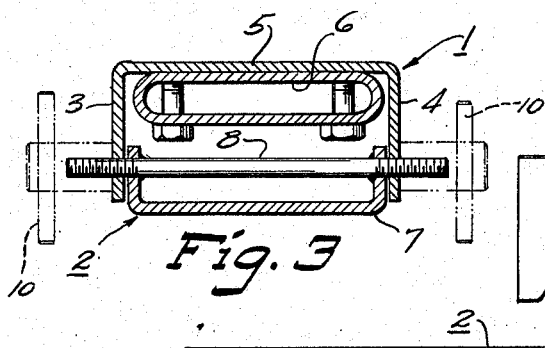
Fig. 3 is a vertical transverse section taken on the center line for the front bar in Fig. 2.

The construction of small tractor hitches for garden implements and the like has presented a number of problems, particularly centered around the fact that any new hitch must fit the hitch members already embodied upon thousands of implements in use, and the fact that the market is a highly competitive one requiring a constant attempt to reduce costs as distinguished from deluxe constructions which are generally more expensive.

The hitch is composed of an upper hitch member 1 and a lower hitch member 2.

The upper hitch member 1 consists of two laterally spaced vertically disposed parallel side plate members 3 and 4 which are preferably constructed as downwardly extending flanges from an upper horizontal web plate 5 secured to the tractor frame 6. The flanges 3 and 4 and web 5 are constructed from a flat plate by a pressing operation bending the flanges to form a generally channel shaped hitch member.

The lower hitch member 2 consists of a shallow upwardly facing channel member 7 of a width preferably sufficiently less than that for the upper hitch member so that the flanges of the channel 7 will readily pass in between the flanges 3 and 4 of the upper member. A pair of parallel transverse horizontal bars 8 and 9 pass through the flanges of channel 7 and are welded thereto. The bars 8 and 9 are spaced apart longitudinally of the channel 7 and lie preferably in a common horizontal plane, bar 8 being the front bar, and bar 9 being the rear bar of the hitch.

The ends of bars 8 and 9 carry suitable clamping means for securing the two hitch members 1 and 2 together when assembled. In the embodiment illustrated, the clamping means consist of wing cap nuts 10 threaded onto the corresponding ends of the rods 8 and 9.

For the purpose of assembly of the hitch members 1 and 2, the lower edge of each of the plates 3 and 4 of the upper hitch member is provided with a front slot 11 and a rear slot 12 to receive the corresponding front and rear bars 8 and 9. The corresponding slots 11 of plates 3 and 4 are aligned transversely of the hitch member to receive bar 8, and likewise, the corresponding slots 12 of plates 3 and 4 are aligned transversely of the hitch member to receive bar 9. The slots 11 are identical to each other, and likewise, the slots 12 are identical to each other.

Each slot 11 and 12 is of generally right angle contour with a vertical short leg constituting the mouth 13 of the slot opening downwardly of the edge of the corresponding plate, and with a horizontal leg extending rearwardly from the mouth portion a substantial distance and constituting the body of the respective slot.

The spacing of the slots 11 and 12 for each of the side plates 3 and 4 is correlated to the spacing of bars 8 and 9 to provide a unique and greatly improved manner of assembly for the hitch whereby a single operator, by manipulating the tractor relative to the implement, can readily complete the assembly even though the tractor and implement may not be in true alignment in either longitudinal or transverse vertical planes or in the horizontal plane.

Figure 4:
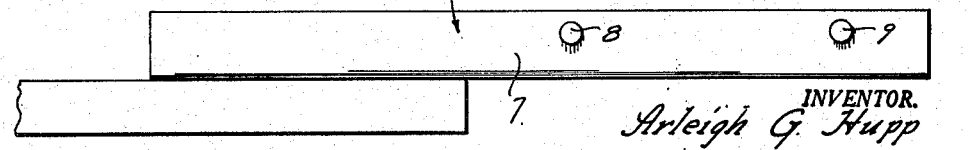
Fig. 4 is a side elevation of the upper hitch member showing the bars of the lower hitch member in the position of Fig. 1.
Figure 5:
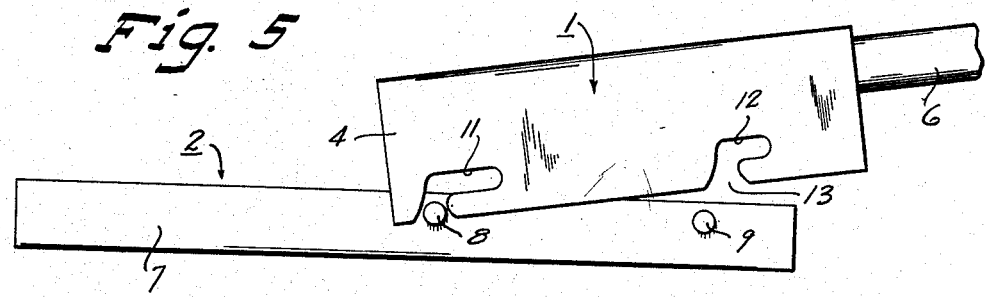
Fig. 5 is a view similar to Fig. 4 showing the upper hitch member tilted downwardly and the front bar of the lower hitch member entering the mouth of the front slots of the upper member.
Figure 6:
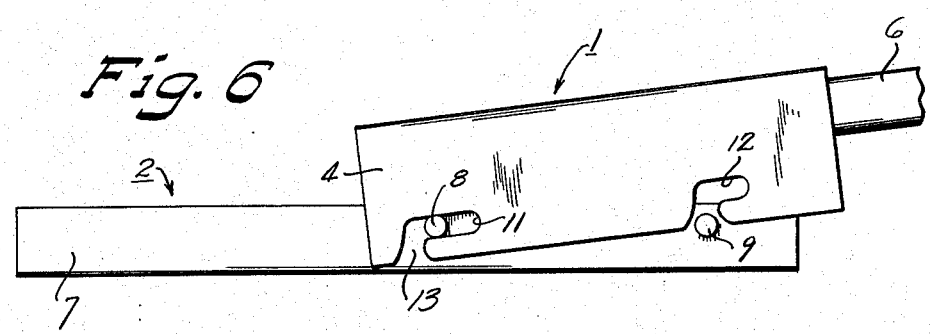
Fig. 6 is a view similar to Fig. 5 showing the forward sliding of the upper hitch member until the front bar enters the front horizontal slots.
Figure 7:
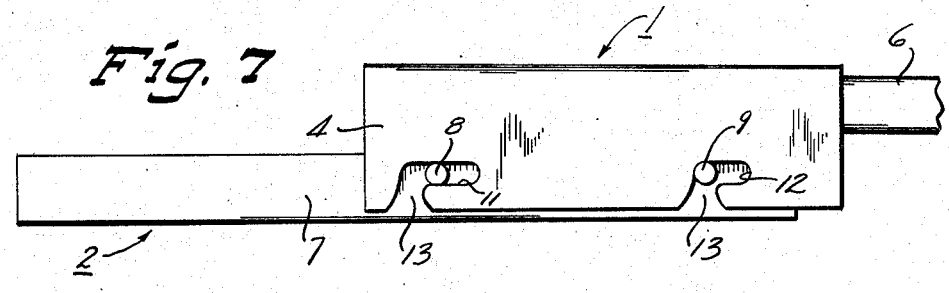
Fig. 7 is a view similar to Fig. 6 showing the lifting of the lower hitch member by the front bar until the rear bar enters the rear slots in the upper hitch member.
Figure 8:
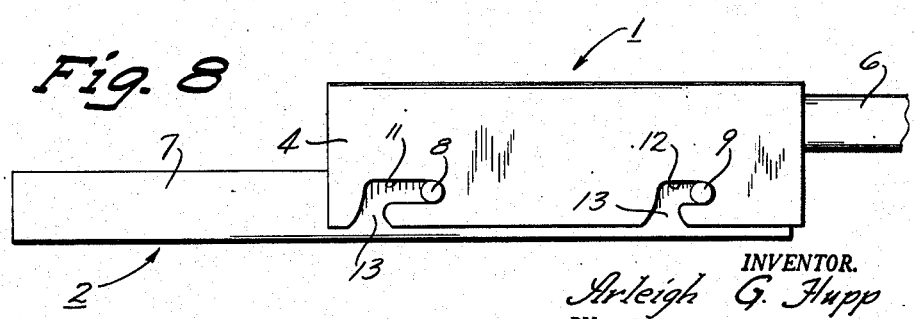
Fig. 8 is a view similar to Fig. 7 showing the hitch members in final relative position after forward movement of the upper member drives the bars home in the corresponding slots.

Figs. 4 to 8, inclusive, illustrate the successive steps in assembly of the hitch members and show the importance of the relative spacing and shape of the slots correlative to the bars.

The mouth 13 of slot 11 is spaced forwardly from the mouth 13 of slot 12 a greater distance than the spacing of the bars 8 and 9 so that front bar 8 will enter the mouth 13 of slot 11 prior to the entrance of rear bar 9 into the mouth 13 of slot 12. As the front bar 8 moves over the tip of the tongue 14 separating the body of slot 11 from the lower edge of the side plate a slight lift on the upper hitch member 1 will lift the lower hitch member 2 until bar 9 enters the mouth 13 of slot 12 and the two hitch members lie in substantially the same horizontal plane. Then a forward movement of the upper hitch member 1 will effect movement of both bars 8 and 9 rearwardly to the rear ends of the corresponding slots 11 and 12. The rear ends of the slots 11 and 12 are preferably spaced to correspond with the spacing of the bars 8 and 9 so that when the bars are driven home in the slots they can be clamped tightly to the side plates without lack of rigidity of the latter.

Where the tractor and implement are out of alignment prior to assembly, the engagement of the lower edges of side plates 3 and 4 ahead of the mouths 13 of slots 11 with the front bar 8 is utilized to manipulate the same into alignment as the bar 8 enters the mouths. For this purpose, the mouth 13 of each slot 11 should open widely and have its forward wall curved gradually to merge with the lower edge of the side plate.

In assembling the hitch members the side plates 3 and 4 straddle the channel 7 and enter downwardly on opposite sides of the same between the corresponding flanges of the channel and the nuts 10. After assembly of the hitch is completed, the nuts 10 are tightened on the ends of rods 8 and 9 to clamp the side plates securely between the nuts and the corresponding flanges of channel member 7.

The hitch serves to push the implement and there is no tendency for the bars 8 and 9 to move forwardly in the slots 11 and 12. Since the slots are disposed horizontally there is no tendency for bars 8 and 9 to drop out of the same, and the tractor can serve to maintain the desired vertical position of the implement. The nuts 10 need not be stressed too tight since they are not required to maintain the relative vertical positions of the tractor and implement.

Various embodiments of the invention may be employed within the scope of the present invention.

I claim:

1. A tractor hitch of the class described, comprising a pair of frame members disposed in superimposed relation, a pair of laterally spaced longitudinally disposed parallel vertical side plates carried by the upper of said frame members and constituting one hitch member, a pair of horizontally spaced transverse parallel bars carried by the lower of said frame members and constituting a second hitch member assembled with said first named hitch member, and a pair of slots receiving said bars and disposed horizontally in each side plate, said slots being spaced longitudinally of the side plate to correspond generally to the spacing of said transverse bars, the forward end of each slot opening downwardly through the lower edge of the corresponding side plate to provide a mouth therefor for entrance of the corresponding bar into the respective slot, the forward slot in each side plate being longer than the rear slot and having its mouth spaced from the mouth of the rear slot a greater distance than the spacing of said bars whereby the forward bar enters the horizontal portion of the forward slot before the rear bar enters the mouth of the rear slot, and the rear end of each slot being closed to hold the corresponding bar against forward thrust by said upper frame member.

2. A tractor hitch of the class described, comprising a pair of frame members disposed in superimposed relation, a pair of laterally spaced longitudinally disposed parallel vertical side plates carried by the upper of said frame members and constituting one hitch member, a pair of horizontally spaced transverse parallel bars carried by the lower of said frame members and constituting a second hitch member assembled with said first named hitch member, and a pair of slots receiving said bars and disposed horizontally in each side plate, said slots being longitudinally of the side plate to correspond generally to the spacing of said transverse bars, the forward end of each slot opening downwardly through the lower edge of the corresponding side plate to provide a mouth therefor for entrance of the corresponding bar into the respective slot, and the mouth of the front slot being spaced forwardly from the mouth of the rear slot a distance greater than the spacing of said bars to provide for entrance of the front bar into its corresponding slot prior to entrance of the rear bar into its corresponding slot.

3. A tractor hitch of the class described, comprising a pair of frame members disposed in superimposed relation, a pair of laterally spaced longitudinally disposed parallel vertical side plates carried by the upper of said frame members and constituting one hitch member, a pair of horizontally spaced transverse parallel bars carried by the lower of said frame members and constituting a second hitch member assembled with said first named hitch member, and a pair of slots disposed horizontally in each side plate and receiving the corresponding bars, the rear ends of the slots being spaced longitudinally of the plate a distance corresponding to the spacing of said bars to hold the bars against forward thrust by said upper frame member, the forward end of each slot opening downwardly through the lower edge of the corresponding side plate to provide a mouth therefor for entrance of the corresponding bar into the respective slot, and the mouth of the front slot being spaced forwardly from the mouth of the rear slot a distance greater than the spacing of said bars to provide for entrance of the front bar into its corresponding slot prior to entrance of the rear bar into its corresponding slot.

4. A tractor hitch of the class described, comprising a pair of frame members disposed in superimposed relation, a pair of laterally spaced longitudinally disposed parallel vertical side plates carried by the upper of said frame members and constituting one hitch member, a pair of horizontally spaced transverse parallel bars carried by the lower of said frame members and constituting a second hitch member assembled with said first named hitch member, and a pair of slots receiving said bars and disposed horizontally in each side plate, said slots being spaced longitudinally of the side plate to correspond generally to the spacing of said transverse bars, the forward end of each slot opening downwardly through the lower edge of the corresponding side plate to provide a mouth therefor for entrance of the corresponding bar into the respective slot, the forward slot in each side plate being longer than the rear slot and having its mouth spaced from the mouth of the rear slot a greater distance than the spacing of said bars whereby the forward bar enters the horizontal portion of the forward slot before the rear bar enters the mouth of the rear slot, and a clamp on each end of each transverse bar for receiving the corresponding side plate for securing the members in assembled relation with said bars disposed in the horizontal portions of the corresponding slots rearwardly of said downwardly opening slot mouths.

5. A tractor hitch of the class described, comprising a pair of frame members disposed in superimposed relation, a pair of laterally spaced longitudinally disposed parallel vertical side plates carried by the upper of said frame members and constituting one hitch member, a pair of horizontally spaced transverse parallel bars carried by the lower of said frame members and constituting a second hitch member assembled with said first named hitch member, and a pair of slots receiving said bars and disposed horizontally in each side plate, said slots being spaced longitudinally of the side plate to correspond generally to the spacing of said transverse bars, the forward end of each slot opening downwardly through the lower edge of the corresponding side plate to provide a mouth therefor for entrance of the corresponding bar into the respective slot, and the mouth of the front slot being spaced forwardly from the mouth of the rear slot a distance greater than the spacing of said bars to provide for entrance of the front bar into its corresponding slot prior to entrance of the rear bar into its corresponding slot, and a clamp on each end of each transverse bar receiving the corresponding side plate and securing the members in assembled relation with said bars disposed in the horizontal portions of the corresponding slots rearwardly of said downwardly opening slot mouths.

6. A tractor implement hitch of the class described, comprising a channel having a horizontal web secured to the tractor and downwardly extending vertical side flanges constituting one hitch member, a second channel having a horizontal web secured to the implement and upwardly extending vertical side flanges adapted to be disposed between and adjacent to the lower edge portions of the flanges of said first named hitch member and constituting a second hitch member, a pair of horizontally spaced transverse parallel bars secured through the flanges of said second hitch member, a pair of horizontally spaced slots in the lower edge of each flange of said first named hitch member, said slots for each flange having downwardly opening mouths spaced apart a greater distance than the spacing of said bars and having spaced rearwardly extending closed slot ends constituting seats receiving the corresponding bars, and threaded nuts on the ends of said bars clamping the flanges of said first named hitch member rigidly against the flanges of said second hitch member when said bars are seated in the corresponding slots.

ARLEIGH GLYNN HUPP.

References Cited in the file of this patent

UNITED STATES PATENTS

| Number | Name | Date |
|---|---|---|
| 867,162 | Seidl | Sept. 24, 1907 |
| 1,378,793 | Johnson | May 17, 1921 |
| 1,389,697 | Phipps | Sept. 6, 1921 |
| 1,505,318 | Barlow | Aug. 19, 1924 |
| 2,368,290 | Donald | Jan. 30, 1945 |
| 2,489,274 | Donald | Nov. 29, 1949 |